May 11, 1943.  L. COOK  2,319,114
CONTROL APPARATUS
Filed Feb. 10, 1941  8 Sheets-Sheet 1

Fig. 1.

INVENTOR
Lyman Cook
BY
Blair, Curtis & Hayward
ATTORNEYS

May 11, 1943.　　　　　L. COOK　　　　　2,319,114
CONTROL APPARATUS
Filed Feb. 10, 1941　　　　8 Sheets-Sheet 2

Fig. 2.

INVENTOR
Lyman Cook
BY
Blair, Curtis + Hayward
ATTORNEYS

May 11, 1943.   L. COOK   2,319,114
CONTROL APPARATUS
Filed Feb. 10, 1941   8 Sheets-Sheet 5

INVENTOR
Lyman Cook
BY
Blair, Curtis & Hayward
ATTORNEYS

May 11, 1943.  L. COOK  2,319,114
CONTROL APPARATUS
Filed Feb. 10, 1941  8 Sheets-Sheet 8

Fig. 19.

INVENTOR
Lyman Cook
BY
Blair, Curtis & Hayward
ATTORNEYS

Patented May 11, 1943

2,319,114

UNITED STATES PATENT OFFICE 2,319,114

CONTROL APPARATUS

Lyman Cook, Foxboro, Mass., assignor to The Foxboro Company, Foxboro, Mass., a corporation of Massachusetts Application February 10, 1941, Serial No. 378,314

15 Claims. (Cl. 236—46)

This invention relates to apparatus for varying the value of a controlled variable condition of a process in accordance with a predetermined time schedule or program.

In industrial processes it is sometimes advantageous to control a process in accordance with a time schedule so that, for example, a variable process condition such as temperature is controlled, but the value at which it is controlled is shifted in accordance with a time schedule or program. In some cases, the optimum value or rate of change of temperature or other process condition to be controlled may vary with the type of material being processed or with the characteristics desired in the finished product, or with both. Thus, for example, in the dyeing of cloth, different heating schedules may be required for different types of dyes and for different weights and kinds of fabrics. In such cases it may be necessary to make frequent changes in the time temperature schedule used and apparatus for automatically maintaining such a schedule should have operating flexibility, that is, it should be so constructed as to facilitate changes of schedule.

In one type of controller which has heretofore been used to maintain a schedule, such as time temperature, the value at which the controller attempts to maintain the process condition, i. e., the "set point" is set up or down as the case may be according to a time schedule by means of a cam. Apparatus of this character is relatively inflexible. The schedule maintained by such a controller can only be changed by changing the cam, and where many different schedules are used, it is necessary to keep on hand a large stock of cams. The accuracy of the controller, of course, depends upon the accuracy with which the cam surface is cut, and skill is required to cut the cam surface to give desired precision. Furthermore, it may be inconvenient to change from one cam to another. In those cases where adjustable cam type instruments have been used, they have tended to give less than desired accuracy of control.

The apparatus of the present invention gives improved flexibility and accuracy. The schedule to be maintained by the controller may be rapidly and easily changed by making a few simple adjustments and an infinite number of different schedules may be obtained. No new cam surfaces need be cut, and the inconvenience involved in keeping a large stock of cams on hand is avoided.

In the present embodiment, the invention is described as applied to the problem of maintaining a predetermined time temperature schedule and the specific schedule chosen to illustrate the invention comprises a heating period during which the process temperature may be brought up to a predetermined value, a second heating period of predetermined duration during which the temperature may be caused to rise at a predetermined rate, and a third period of predetermined duration during which the temperature may be maintained constant at a predetermined maximum value.

The many objects and advantages of the present invention may best be appreciated by reference to the accompanying drawings, wherein.

Figure 19:
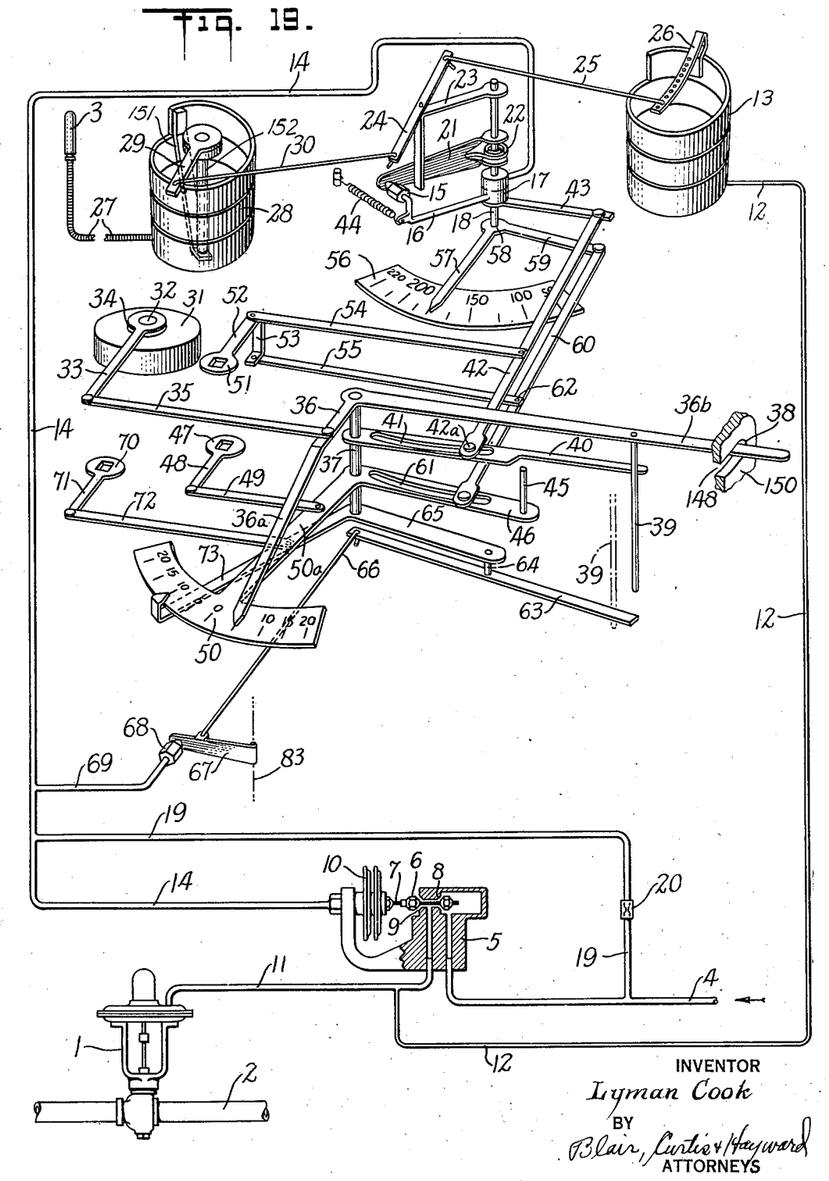
Figure 19 is an expanded perspective diagrammatic illustration of portions of the apparatus.

Referring to the drawings, and more particularly to the lower left-hand corner of Figure 19, there is shown a pneumatically operated control valve 1 which regulates the flow of a heating fluid such as steam in a pipe line 2 which supplies a process (not shown). Air to operate the valve 1 is supplied to a control head 5 through a pipe 4 from a suitable source (not shown). The control head 5 regulates the air pressure supplied to the valve 1 and comprises a double headed valve 6 mounted on a stem 7 and adapted to cooperate with a supply port 8 communicating with supply line 4 and an exhaust port 9 communicating with atmosphere. Double headed valve 6 is operated by expansion and contraction of a bellows 10 and serves to regulate the air pressure supplied through a pipe 11 to the pneumatically operated control valve 1. As the bellows 10 expands, the double headed valve moves to the right reducing exhaust port 9 and enlarging supply port 8 to increase the pressure in line 11 and further open control valve 1. Similarly, as bellows 10 contracts, the pressure in line 11 is decreased to move the valve 1 toward closed position. Control head 5 also regulates the pressure in line 12 connecting line 11 with a helical pressure-responsive element 13.

The interior of bellows 10 communicates through a pipe 14 (see upper part of Figure 19) with a nozzle 15 supported on a tubular bracket 16 secured to a hollow collar 17 rotatably mounted on a shaft 18. Air is supplied to the pipe 14 (lower part of Figure 19) and nozzle 15 from supply line 4 through a branch line 19 containing a restriction 20 which limits the flow of air to the nozzle. The bellows 10 is operated from the pressure in the line 14 back of the nozzle 15. This pressure is varied by means of a flapper 21 which is mounted to oscillate on the shaft 18. Flapper 21 is continuously urged by a light spring 22 against a flapper actuating lever 23 also mounted to oscillate on shaft 18 and pivotally connected to differential lever 24, the upper end of which is connected by link 25 to lever 26 of the pressure-responsive helix 13. The helix 13 cooperates with flapper 21 and nozzle 15 to operate the control head 5 to supply to the helix 13 the proper pressure to maintain the flapper and nozzle in operative relationship. This operative relationship is such that when the flapper is against the nozzle or is in its closest operative position with respect to the nozzle, full back pressure exists in the line 14 and bellows 10 and maximum pressure exists in helix 13; whereas when the flapper moves away from the nozzle beyond a certain distance, minimum pressure exists in helix 13. The distance through which the flapper moves with respect to the nozzle to bring about these minimum and maximum pressures is about .001 of an inch. With this construction, the pressure in the helix 13 is maintained sufficient to keep the flapper in its operative position with respect to the nozzle and this pressure is the output pressure of the instrument and operates the pneumatically operated valve 1.

The flapper 21 is also positioned in response to the temperature of the process being controlled. Referring to the upper left-hand part of Figure 19, a temperature-responsive element 3, suitably located to measure the temperature of the process, is connected through a flexible tube 27 with a helical temperature-responsive device 28. The element 3, tube 27, and helix 28 form a thermal system of such a character that an increase in temperature causes the helix 28 to unwind and a decrease in temperature causes it to wind up. The helix is connected by a strip 151 to a rotatable shaft 152 upon which is mounted a lever 29. The operative connection between the helix and the lever 29 may be similar to that disclosed in Reynolds Patent No. 1,970,819. Lever 29 is connected through link 30 to the lower end of differential lever 24 so that an increase in temperature tends to move the flapper away from the nozzle and a decrease in temperature tends to move the flapper toward the nozzle.

The mechanism described thus far tends to maintain the temperature of the process constant providing no permanent changes in the demand of process are encountered and its operation is as follows: If the temperature starts increasing above the control value, helix 28 tends to unwind and to move flapper 21 away from the nozzle 15 thereby reducing the pressure in the pipe 14 and on the bellows 10. This causes the output of the control head to decrease, thereby decreasing the pressure in line 12 and in the helix 13. Helix 13 tends to wind up and restore the flapper to its operating position with respect to the nozzle 15. In this manner the nozzle and flapper under the control of the helix 13 cause the control head to decrease the pressure in the line 12 in proportion to the increase of the temperature. This decrease in the pressure in the line 12 is communicated through the line 11 to the valve 1, causing it to decrease the supply of heat to the process thereby counteracting the condition causing the temperature to increase above the control point and thus endeavors to restore the temperature to its original value. With a decrease in temperature the operation of the parts is reversed.

The temperature maintained by the above described mechanism depends upon the position of the nozzle 15 and may be varied by turning the nozzle and tubular bracket 16 on shaft 18. As pointed out above, the illustrative schedule here used includes an interval during which the temperature rises at a constant rate followed by an interval during which the temperature is maintained at a constant value. This schedule is obtained in the present embodiment by moving the nozzle at a predetermined rate for a predetermined interval and then holding the nozzle stationary for a further predetermined interval.

There are three variable factors which determine the characteristics of such a schedule:

(a) the time interval during which the temperature is changed; (b) the temperature rise, that is, the final temperature attained relative to a fixed initial temperature; and (c) the time interval during which the temperature is held constant. In the apparatus here described, each of these three factors is adjustable to give commercially desirable flexibility.

Mechanism for moving the nozzle 15 will now be described. Referring to the upper left portion of Figure 19, power to move the nozzle is supplied by a synchronous electric motor 31 which through suitable reduction gearing drives a shaft 32 at a relatively slow constant speed in a clockwise direction as shown. Frictionally connected to the shaft 32 there is a clutch disc 34 carrying a lever 33 which, through a link 35, is connected to a main operating lever 36 having a time-of-rise indicating arm 36a and a manually adjustable arm 36b. Operating lever 36 is rotatably mounted on shaft 37 and, to place the mechanism in starting position, is manually moved in a counterclockwise direction until arm 36b bears against a stop 38. In the present embodiment, the arm 36b extends through a slot 148 of a casing 150 for housing the apparatus and the upper end of the slot 148 forms the stop 38.

Arm 36b is provided with a depending member 39 which, in the position shown in Figure 19, intercepts arc-slotted lever 40, also rotatably mounted on shaft 37 and provided with an arcuate slot 41. Slidably pivoted at 42a in the slot 41 there is a link 42 which, at its upper end, connects pivotally with a lever 43 fixed to the collar 17 of the nozzle mounting. A spring 44 connected to the tubular bracket 16 continuously urges the nozzle mounting clockwise and hence urges lever 40 clockwise to bear against member 39 of the operating lever 36. As the motor 31 rotates shaft 32, operating lever 36 is rotated clockwise and arc-slotted lever 40, since it bears against member 39, follows the operating lever to cause nozzle 15 and its mounting to move at a constant rate clockwise. As will appear more fully below, the initial control temperature of the mechanism is determined by the position of the stop 38.

Clockwise rotation of arc-slotted lever 40 on shaft 37 is limited by a stop 45 on a second arc-slotted lever 46, also rotatably mounted on shaft 37. When arc-slotted lever 40 meets the stop 45 on arc-slotted lever 46, the operating lever 36 continues to move clockwise, but arc-slotted lever 40 and hence nozzle 15 stop moving. Thus the time during which the nozzle is moving, that is, the time-of-rise interval, is determined by the distance which the arc-slotted lever 40 travels from its initial position to the point where it meets the stop 45, or in other words, by the initial angular relationship between arc-slotted lever 40 and arc-slotted lever 46.

This time-of-rise interval may be adjusted in the following manner: Arc-slotted lever 46 is a bell crank lever having an arm 50a which supports a time scale 50. The arc-slotted lever and its associated time scale may be rotated on shaft 37 by rotating an adjustment stud 47 which carries a lever arm 48 connected to arm 50a by a link 49. The relationship of the parts is such that when arm 36b is against stop 38 and arc-slotted lever 40 is in contact with stop 45, indicating arm 36a is opposite zero on time scale 50. As stud 47 is rotated clockwise, time scale 50 also moves clockwise under the time-of-rise indicating arm 36a and since arc-slotted lever 46 is integral with time scale 50, it will be moved to a position corresponding to the time which the indicating arm 36a indicates on the time scale. It is thus apparent that when the indicating arm 36a in its clockwise movement reaches zero on the time scale, the arc-slotted lever 40 will at substantially the same instant meet the stop 45 on arc-slotted lever 46, nozzle 15 will stop moving, and the temperature of the process will be maintained constant at a predetermined value.

The total amount the nozzle moves during a particular time-of-rise interval, and consequently its rate of movement during that interval, may also be adjusted by moving pivot point 42a in slot 41. As pivot point 42a is moved closer to shaft 37, for example, a given movement of arc-slotted lever 40 will permit less and less movement of the nozzle 15 by the spring 44 because the effective length of arc-slotted lever 40 is reduced. Contrariwise, as the pivot point 42a is moved further from shaft 37, a given movement of arc-slotted lever 40 will permit greater and greater movement of nozzle 15. Hence the position of pivot point 42a with respect to shaft 37 determines the distance the nozzle moves during a particular time interval and, since operating arm 36b moves at a constant rate and arc-slotted lever 40 moves with operating arm 36b, this relative position of pivot and shaft also determines the rate at which the nozzle moves.

The above-described adjustment is made in the following manner: Located near the motor 31 is an adjustment stud 51 having an integral lever 52 which is connected to one end of a link 54. A backwardly extending arm 53 of lever 52 connects the lever with a second link 55 in such a way that adjustment of stud 51 moves the two links 54 and 55 conjointly. Link 54 is pivotally connected at its other end to link 42 so that rotation of adjustment stud 51 moves pivot 42a in slot 41.

As pointed out above, the amount of nozzle movement determines the amount of temperature rise and in order to indicate how far the nozzle will move or, stated differently, what maximum temperature will be reached with respect to a particular initial temperature, there is provided a temperature scale 56 which is immovable and a movable pointer 57. Pointer 57 is a bell crank pivoted at 58 and having an arm 59 connected by a link 60 to the arcuate slot 61 of arc-slotted lever 46. Link 55 is pivotally connected to link 60 at 62. Thus, the rotation of adjustment stud 51 to set the amount of nozzle movement for a given time interval also moves pointer 57 to indicate on temperature scale 56 the temperature which will eventually be reached.

After arc-slotted lever 40 meets stop 45 on arc-slotted lever 46, operating lever 36 continues moving clockwise until member 39 strikes one end of a cut-off lever 63 which is pivoted at 64 on a bell crank lever 65. Cut-off lever 63 at its other end is connected by a flapper actuating link 66 to a flapper 67 cooperating with a nozzle 68 connected to the line 14 by a branch line 69. As the operating arm 36 rotates the cut-off lever 63 about its pivot 64, the flapper 67 is drawn away from nozzle 68 and pressure in bellows 10 drops to that of the atmosphere. Hence pressure in line 11 also becomes equal to atmospheric pressure and the control valve 1 closes to cut off the steam to the process.

The time-of-hold interval is determined by the time required for the operating lever 36 to move from the point where arc-slotted lever 40 meets stop 45 to the point where member 39 of the operating lever strikes the cut-off lever 63. This interval may also be adjusted as follows (see left-hand side of Figure 19): An adjustment stud 70 has an integral lever 71 connected by a link 72 to the indicating arm 73 of bell crank 65. Rotation of adjustment stud 70 moves bell crank 65 to adjust the position of cut-off lever 63 with respect to operating lever 36, and indicating arm 73 indicates on time scale 50 the magnitude of the time-of-hold interval.

In practical operation, the temperature of the process at the beginning of a run is frequently below the initial or minimum control temperature which, as described above, is the temperature corresponding to the position of the nozzle 15 when arm 36b is in contact with stop 38. Hence it is desirable that mechanism be provided which will permit the initiation of the cycle of events referred to above only after the process has reached this minimum control temperature. In the present embodiment, this is accomplished by an automatically controlled starting switch mechanism for starting electric motor 31 when the minimum control temperature has been reached. The starting switch mechanism comprises in general a pneumatic relay which is made operative at the minimum control temperature and which actuates a mercury switch to close an electrical circuit supplying power to the motor. This mechanism will now be described.

Figure 5:
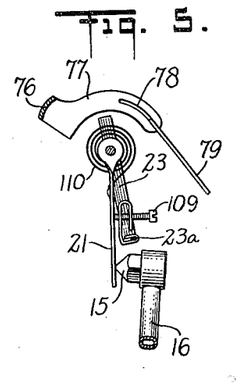
Figure 5 is a vertical section taken along line 5—5 of Figure 3 and showing the connection of the assembly to the starting mechanism.
Figure 6:
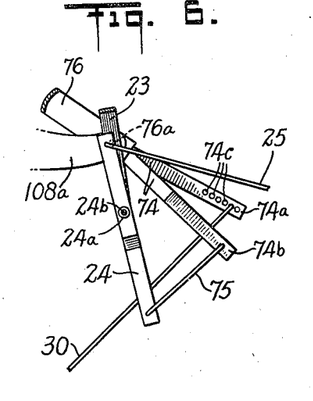
Figure 6 is a vertical section taken along the line 6—6 of Figure 3 and showing the connection of the assembly to the temperature responsive mechanism.

Referring now to Figures 3, 5, 6, and 14 of the drawings, and particularly to Figure 6, the link 30, through an intermediate linkage not shown in Figure 19, positions the lower end of differential lever 24 in accordance with the value of the temperature of the process. As shown in Figure 6, the upper end of link 30 is connected to one arm 74a of a forked lever 74 pivoted at 76a. Pivot 76a (see Figure 3) is located on an arm 108a of a mounting 108 which is fixed to the instrument casing 150. Reverting to Figure 6, the other arm 74b of the forked lever is connected by the link 75 to the lower end of differential lever 24. A series of holes 74c are provided in the arm 74a of the forked lever 74, the function of the holes 74c being to permit adjustment of the effective length of lever arm 74a and so of the relationship between movement of link 30 and the lower end of differential lever 24.

Figure 12:
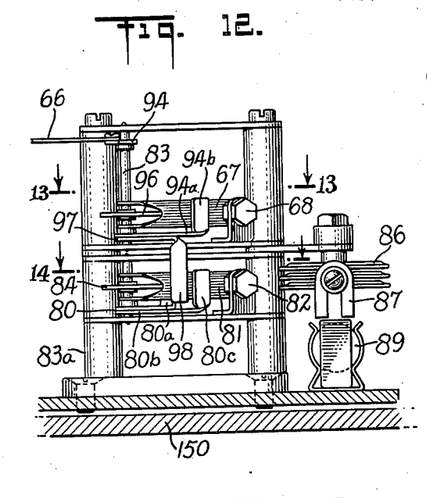
Figure 12 is a bottom plan view partly in section of the motor switch mechanism and cut-off nozzle taken along line 12—12 of Figure 2.

Operatively integral with forked lever 74 is a U-shaped bracket 76 which is pivotally supported at one end on arm 108a and at its other end on arm 108d of mounting 108. As shown in Figure 5, bracket 76 has an arcuate arm 77 provided with an arcuate slot 78. A link 79, the upper end of which is slidably secured in slot 78, is at its lower end (Figure 14) connected to arm 80a of a bell crank flapper actuating lever 80 rotatably mounted on a shaft 83 which (see Figure 12) is supported in a mounting 83a secured to the casing 150. Reverting to Figure 14, arm 80b which is operatively integral with arm 80a is adapted, through a forwardly projecting lip 80c, to bear against a micrometer adjusting screw 81a mounted on a flapper 81 and to move the flapper with respect to a nozzle 82. Flapper 81 is also mounted on shaft 83 and is continuously urged toward lip 80c by a light spring 84.

The operation of the mechanism just described is as follows: When the temperature of the process is below the minimum control temperature of the apparatus, bracket 76 is so positioned by thermal element 28 that the upper end of link 79 rests against the lower end of slot 78 and flapper 81 is held away from nozzle 82. The flapper is continuously urged in a clockwise direction toward nozzle 82 by the force of gravity. As the temperature of the process increases, bracket 76 is rotated clockwise as shown in Figure 5 to permit the flapper to approach the nozzle, and when the minimum control temperature is reached the flapper covers the nozzle. Thereafter, as bracket 76 continues to rotate, the upper end of link 79 slides in slot 78 and there is no further relative movement of flapper 81 and nozzle 82 until the end of the cycle. The micrometer screw 81a on flapper 81 permits adjustment of the effective length of the link 79 to make the flapper 81 cover the nozzle 82 at the desired temperature value.

Figure 11:
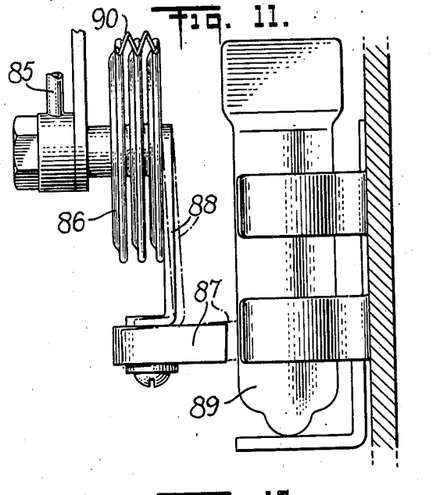
Figure 11 is a side elevation partly in section taken along the line 11—11 of Figure 2 and showing portions of the starting switch mechanism for the motor which drives the various time responsive portions of the apparatus.
Figure 15:
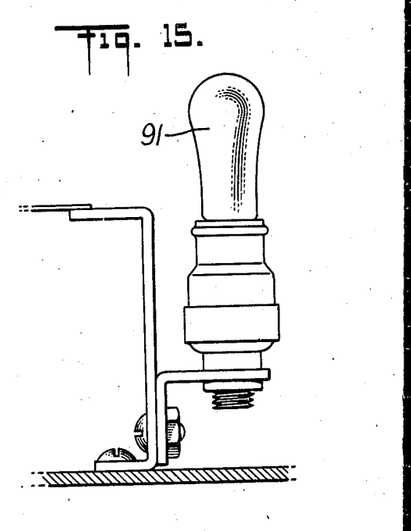
Figure 15 is a horizontal section taken on line 15—15 of Figure 2 showing the signal lamp and bracket.

Nozzle 82 communicates through a pipe 85 (see Figure 11) with the interior of a bellows 86 and the pneumatic system thus formed is supplied with air under pressure from a suitable source (not shown). When flapper 81 covers nozzle 82, the pressure behind the nozzle builds up to expand bellows 86. A permanent magnet 87 is mounted on an arm 88 secured to the bellows 86, and expansion of the bellows moves the magnet closer to a mercury switch 89. At its upper end, as shown in Figure 11, bellows 86 is provided with a relatively stiff spring 90 which tends to prevent expansion of the upper end of the bellows and therefore multiplies expansion of the lower end of the bellows and so movement of magnet 87. When bellows 86 is expanded, magnet 87 attracts an armature in mercury switch 89 to close an electrical circuit (not shown) which supplies electrical energy to the motor 31. Thus, when the minimum control temperature is reached, flapper 81 covers nozzle 82 to expand bellows 86 and actuate mercury switch 89 to start the motor 31. A signal lamp 91 (see Figure 15) is connected in parallel in the motor circuit to indicate when the apparatus is functioning as a program controller.

Figure 1:
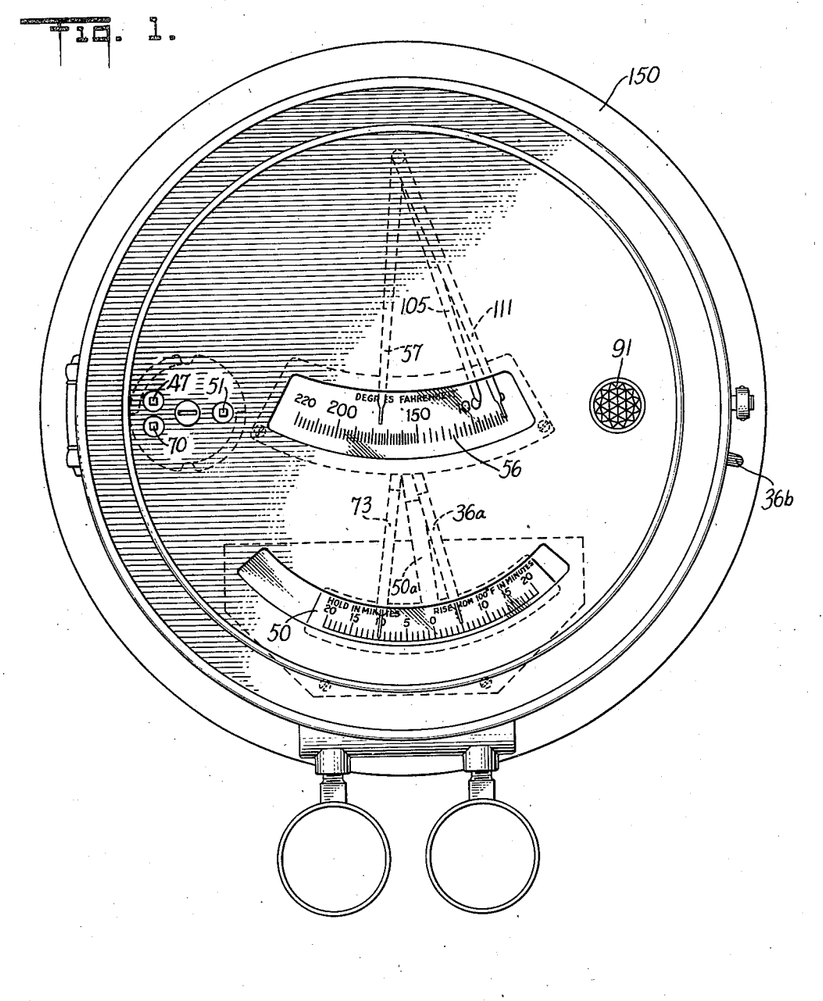
Figure 1 is a front elevation of the exterior of a casing containing apparatus embodying the present invention.
Figure 2:
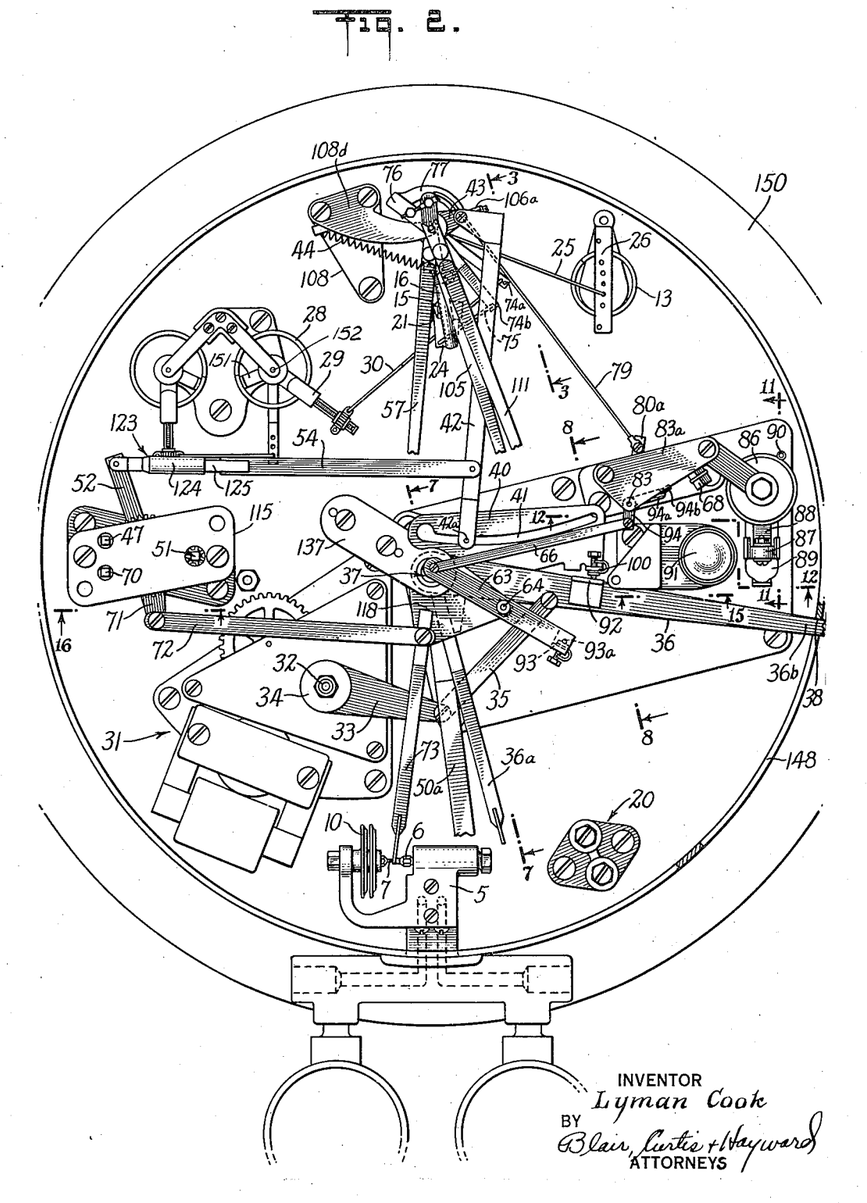
Figure 2 is a composite front elevation of the apparatus with the front of the casing removed (the following figures are mostly enlarged detailed views of the mechanism shown in this figure)
Figure 8:
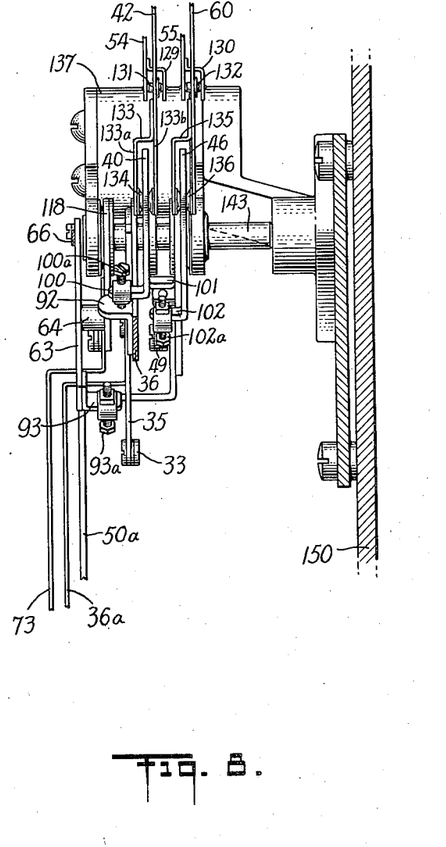
Figure 8 is a staggered vertical section taken along the line 8—8 of Figure 2 and showing certain features of the arc-slotted lever construction.
Figure 13:
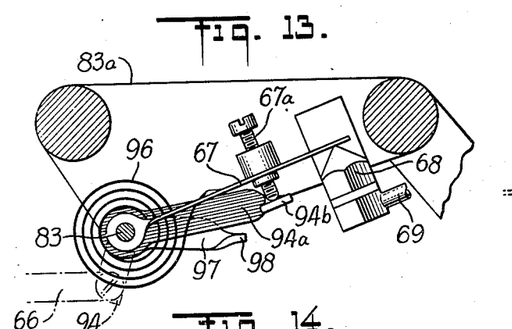
Figure 13 is a vertical section taken on line 13—13 of Figure 12 and showing the pneumatic cut-off nozzle.
Figure 14:
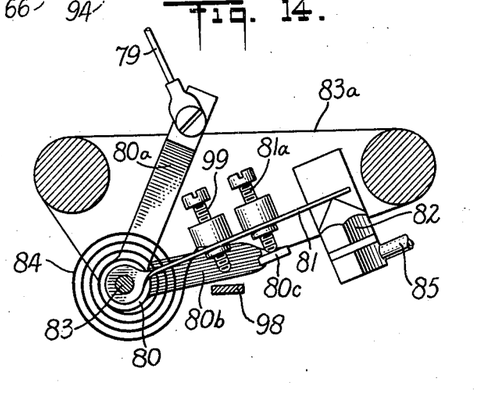
Figure 14 is a vertical section taken on line 14—14 of Figure 12 and showing the motor switch pilot valve.

When the time-of-hold interval referred to above has elapsed, the motor is automatically stopped. The mechanism for stopping the motor comprises in general a linkage actuated by operating lever 36 and operative at the end of the time-of-hold interval to move flapper 81 away from nozzle 82 and thus operate mercury switch 89 to interrupt the flow of electrical energy to the motor. Referring to Figures 2 and 8, operating lever 36 (comprising arms 36a and 36b) is provided with a forwardly projecting lip 92 (diagrammatically represented in Figure 19 as tongue 39) which, as the lever rotates clockwise, hits a micrometer screw 93a of a stop 93 on the lower end of lever 63 causing lever 63 to pivot about 64 (see Figure 2) to move link 66 which is connected to a bell crank flapper actuating lever 94 rotatably mounted on shaft 83. Referring now to Figure 13, an arm 94a of lever 94 is provided with a forwardly projecting lip 94b which bears against a micrometer screw 67a on flapper 67 and is adapted to move the flapper with respect to nozzle 68. The flapper is rotatably mounted on shaft 83 and is urged toward projection 94b by a light spring 96. Fixed to arm 94a is a lever 97 having a backwardly extending arm 98 (best shown in Figure 14) adapted to cooperate with a micrometer screw 99 on flapper 81 of the motor switch mechanism to move the flapper with respect to nozzle 82. The relationship between lever 94 and lever 97 is such that, as lever 94 is moved counterclockwise by link 66, flapper 67 will uncover nozzle 68 to shut off the air supply to the control valve 1 to shut the valve before flapper 81 uncovers nozzle 82 to stop the electric driving motor. The interval between the actuation of the two flappers may be adjusted by adjusting micrometer screw 99 and is sufficient to ensure complete closure of control valve 1 before the motor switch mechanism is operated to stop the electric motor.

The operation of the mechanism thus far described can be followed in general by reference to Figure 19. Operating lever 36 is manually moved counterclockwise until it meets stop 38, thus moving nozzle 15 to a predetermined initial position. Adjustment stud 47 is then rotated to move time scale 50 under indicating arm 36a until the indicating arm indicates the desired time-of-rise interval. Adjustment stud 51 is rotated until temperature pointer 57 indicates on temperature scale 56 the desired maximum temperature. Adjustment stud 70 is then rotated to move indicating arm 73 with respect to time scale 50 until the indicating arm indicates the desired time-of-hold interval. The air supply to the apparatus is thereafter turned on and, if the process temperature is below the minimum control temperature of the apparatus, the control valve 1 will open wide to supply a maximum flow of heating fluid to the process and the temperature will begin to rise. When the minimum control temperature of the apparatus is reached, flapper 81 (Figures 14 and 11) covers nozzle 82 to operate the mercury switch 89 to start the electric motor 31 (Figure 19), and operating lever 36 and nozzle 15 start moving clockwise from their zero or neutral position at a constant rate. Arc-slotted lever 40 follows operating lever 36 to permit nozzle 15 to turn about shaft 18 and change the temperature at a predetermined and controlled rate until lever 40 reaches stop 45 on arc-slotted lever 46. Nozzle 15 then stops moving and the temperature is controlled and held at a constant predetermined maximum value while operating lever 36 continues to move clockwise. When the operating lever reaches stop 93 on lever 63 (Figures 2 and 19), that lever is rotated to cause flapper 67 to uncover nozzle 68, thereby closing control valve 1. Continued movement of operating lever 36 causes flapper 81 (Figures 14 and 11) to uncover nozzle 82, thus opening mercury switch 89 to stop the electric motor 31 and shut off lamp 91 to complete the cycle of operation.

Because the successful operation of the above-described apparatus and the improved results obtainable therewith depend to some extent on the solution of certain constructional problems, portions of the apparatus will now be described in somewhat greater detail.

Figure 9:
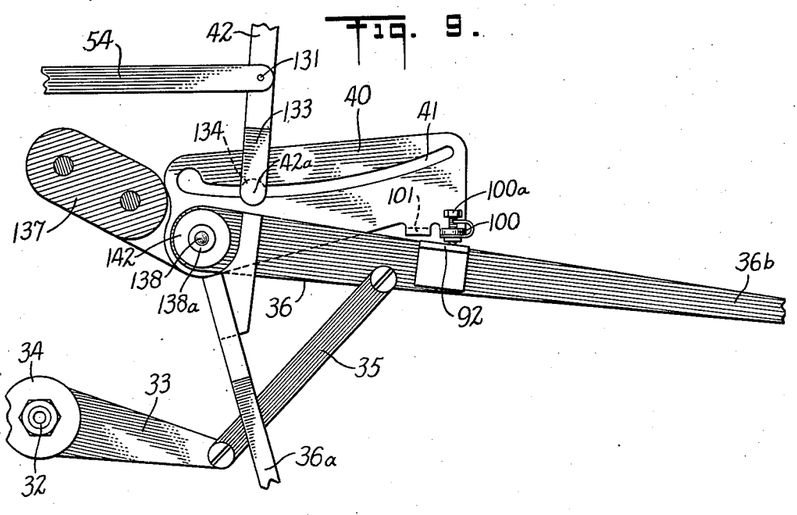
Figure 9 is a vertical section along line 9—9 of Figure 7, showing the front arc-slotted lever and operating arm.

Referring to Figures 2, 8, 9, and 10 of the drawings, and especially Figure 9, the manipulating arm 36b of lever 36 forms an acute angle with the indicating arm 36a. The forwardly extending lip 92 on arm 36b cooperates with a stop 100 on arc-slotted lever 40. Stop 100 is provided with a micrometer adjusting screw 100a to adjust the relationship between arm 36b and arc-slotted lever 40 in such a way that when arm 36b is against stop 38, the upper pivot point (Figure 2) of link 42 will be at the center of curvature of arcuate slot 41 and movement of pivot point 42a in slot 41 will, in this position of the mechanism, cause no movement of nozzle 15. Reverting to Figure 9, arc-slotted lever 40 is provided with a backwardly extending projection or lip 101 adapted to cooperate (Figure 10) with a stop 102 on arc-slotted lever 46 having a micrometer screw 102a. When arc-slotted lever 40 is in its initial or starting position and lever 46 is so positioned that stop 102 is in contact with lip 101 of lever 40, the screw 102a permits adjustment of the relative positions of arc-slotted levers 46 and 40 so that the upper pivot point of link 60 is at the center of curvature of arc 61 and movement of link 60 by link 55 causes no movement of pointer 57 when the parts are in this position. This relationship of levers 40 and 46 is not ordinarily encountered in practice but the adjustment is desirably provided for calibration purposes. The relationship between arc-slotted lever 46 and the arm 50a of time scale 50 is made adjustable by a micrometer screw 103.

Referring now to Figures 1, 2, 3, and 4, and particularly Figure 2, the upper end of link 42 is pivotally connected to nozzle actuating lever 43 as described above in connection with Figure 19 and the nozzle assembly, which is supported (see Figure 3) on arms 108e and 108f of mounting 108, is connected by a U-shaped bracket 104 to a pointer 105 which indicates the position of the nozzle. Link 60 (Figure 4) at its upper end is pivotally connected to an arm 106a of a U-shaped bracket 106 pivotally mounted at one end on an arm 108b and at its other end (Figure 3) on an arm 108g of the mounting 108. Secured to the bracket 106 is the pointer 57 which indicates the maximum temperature to be attained. Reverting to Figure 4, lateral adjustment of pivot point 60a with respect to pivot point 107 of bracket 106 is obtained by means of a micrometer screw 106b on arm 106a. This adjustment may be used to adjust the position of pivot point 60a with respect to arcuate slot 61 of arc-slotted lever 46. Also secured to bracket 106 is an arm 106c having a forwardly extending projection 106d which is adapted to cooperate with the arm 108b to form a stop limit clockwise rotation of arc-slotted lever 46.

Figure 3:
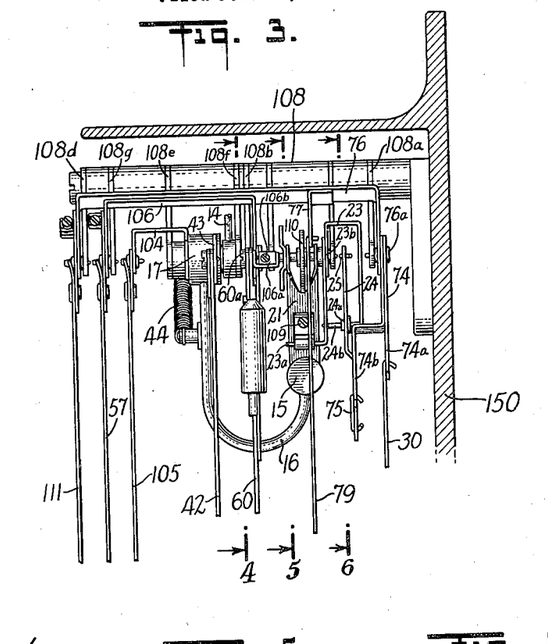
Figure 3 is a side elevation taken along the line 3—3 of Figure 2 and showing an assembly construction in which time and temperature responsive elements cooperate to operate a pneumatic pilot valve.
Figure 4:
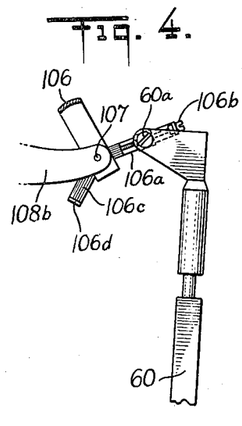
Figure 4 is a vertical section taken along line 4—4 of Figure 3 and showing the connection of the assembly to the time operated part of the controller.

Referring now to Figures 2, 3, 5, and 6, and especially Figures 3 and 6, the differential lever 24 is fixed at 24a to a shaft 24b which passes through the lever and is rotatably supported at its ends in a U-shaped flapper actuating lever 23 which is itself pivotally mounted at 23b. Flapper actuating lever 23 is provided with a lateral extension 23a which (Figure 5), through a micrometer adjusting screw 109, actuates flapper 21. A light spring 110 continuously urges flapper 21 against screw 109 of lever 23. Screw 109 serves to adjust the relationship between flapper 21 and actuating lever 23. As described above, an increase in temperature causes flapper 21 and bracket 76 to rotate clockwise, as shown, and a decrease in temperature causes the flapper and bracket to rotate counterclockwise. Supported on the bracket 76 at its left-hand end as shown in Figure 3 there is a pointer 111 which indicates the temperature of the process. After the temperature of the process reaches the minimum control temperature of the apparatus, pointer 111 and pointer 105 will substantially coincide for the remainder of the cycle; and when the temperature of the process reaches its predetermined maximum value, the three pointers 57, 105, and 111 will substantially coincide for the remainder of the cycle.

Figure 16:
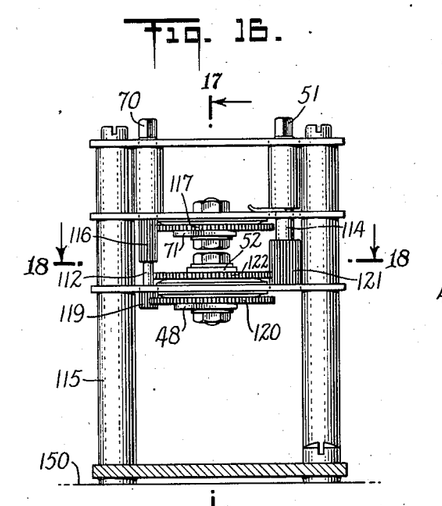
Figure 16 is a bottom plan view partly in section of the adjusting mechanism taken on line 16—16 of Figure 2.
Figure 17:
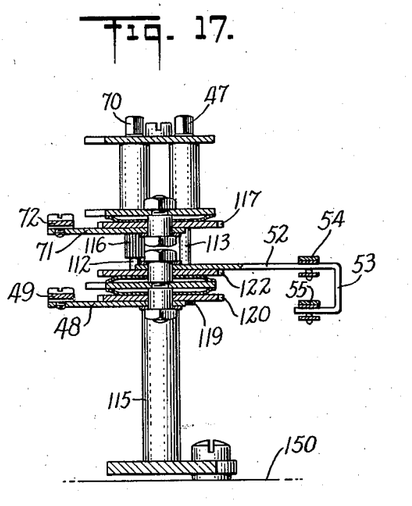
Figure 17 is a vertical section taken on line 17—17 of Figure 16.
Figure 18:
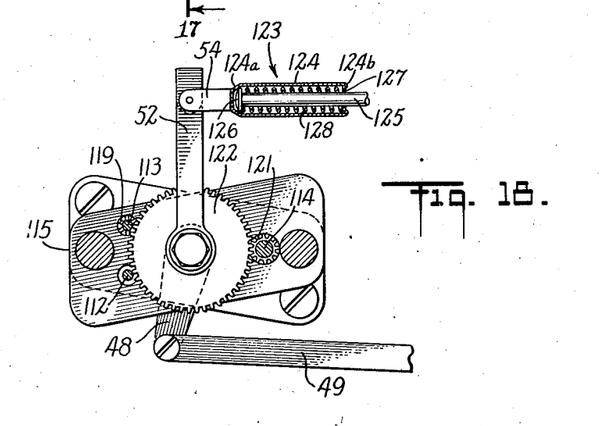
Figure 18 is a vertical section taken on line 18—18 of Figure 16 showing portions of the adjusting mechanism and certain details of the spring lever construction.

Figures 16, 17, and 18 show mechanism for adjusting the time-of-rise interval, the time-of-hold interval, and the maximum temperature. Three shafts, a time-of-hold shaft 112, a time-of-rise shaft 113, and a maximum temperature shaft 114, are rotatably mounted in a mounting 115 secured to the casing 150. The three shafts are provided at their upper ends with squared portions which have heretofore been referred to, respectively, as adjustment stud 70, adjustment stud 47 and adjustment stud 51. Secured to shaft 112 (see Figure 16) is a pinion 116 which engages a gear 117 rotatably supported on mounting 115 and fixed (see Figure 2) to arm 71. Rotation of stud 70 rotates pinion 116, gear 117 and arm 71 to move link 72 which is pivotally connected at its right-hand end to a triangular plate 118 rotatably mounted on shaft 37. The pivot 64 of cut-off lever 63 and the time-of-hold indicating arm 73 are fixed upon plate 118 and thus adjustment of stud 70 adjusts the position of the cut-off lever and moves indicating arm 73 to such a position as to indicate the magnitude of the time-of-hold interval.

Figure 10:
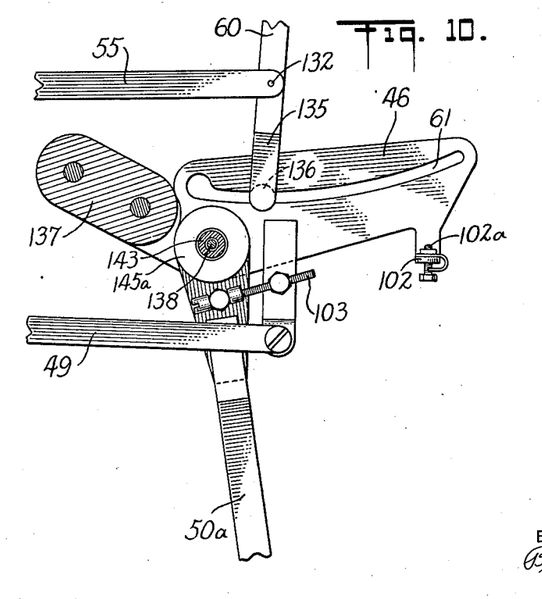
Figure 10 is a vertical section taken along the line 10—10 of Figure 7 and showing the back arc-slotted lever.

Referring again to Figures 16 and 17, shaft 113 is provided with a pinion 119 which engages a gear 120 rotatably supported on mounting 115 and fixed (see Figure 18) to arm 48. Rotation of adjustment stud 47 rotates arm 48 to move link 49 which, as shown in Figure 10, rotates arc-slotted lever 46 and time scale arm 50a on shaft 37. Reverting to Figure 16, shaft 114 is similarly provided with a pinion 121 which engages a gear 122 rigidly secured to arm 52 in such a manner that rotation of stud 51 through arm 52 moves link 55 (see Figure 19) to set temperature limit indicator 57.

In order to prevent injury to the parts due to over-adjustment of the adjustment studs, certain of the links, including links 54 and 55 operated by adjustment stud 51, and link 60 operated by adjustment stud 47, are provided with a safety device such as the sliding connection 123 shown in Figure 18. Sliding connection 123 comprises a sleeve 124 of link 54 which receives the end of a shank 125 of link 54. The shank 125 is provided with a button 126 which is slidably fitted to the interior surface of sleeve 124 and which normally bears against a shoulder 124a of sleeve 124. Button 126 operates against an internal spring 128 which at its right-hand end bears against a washer 127 held in place by a turned-in lip 124b of the sleeve 124. Spring 128 permits elongation of link 54 if the link is subjected to more than ordinary tension while the parts are being adjusted in the manner described above.

Referring now to Figure 8, links 54 and 55 are provided respectively with yokes 129 and 130 which fit over the double pivots 131 and 132, secured respectively to links 42 and 60. Link 42 is provided with a yoke 133 having downwardly extending arms 133a and 133b which embrace arc-slotted lever 40. At their lower ends, arms 133a and 133b are provided with a roller 134 which fits into the arcuate slot 41 of arc-slotted lever 40 and facilitates movement of pivot point 42a in the slot. Link 60 is provided with a similar yoke 135 and roller 136.

Figure 7:
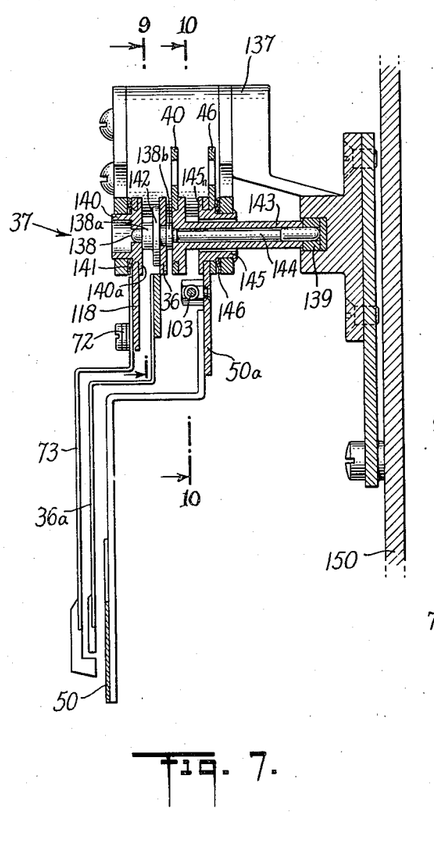
Figure 7 is an axial section taken along the line 7—7 of Figure 2 and showing the main shaft construction.

Figure 7 of the drawings shows the construction of the main shaft 37 which is supported in a mounting 137 secured to the instrument casing 150. A cylindrical rod 138 having hemispherical ends is mounted at its right-hand end in a rigid thrust bearing 139 and at its left-hand end is provided with a shoulder 138a which bears against a bushing 140 fixed to the mounting 137. The time-of-hold indicating arm 73 is rotatably mounted on bushing 140 and is urged against an annular shoulder 140a of the bushing 140 by a spring washer 141 interposed between the arm 73 and the mounting 137. The operating lever 36 including the indicating arm 36a is fixed to a disc 142 integral with the rod 138. For most of its length the rod 138 is embraced by a sleeve or bushing 143 which is fixed to and supports arc-slotted lever 40. A portion of rod 138 within the bushing 143 is reduced in diameter as at 144 to decrease friction between the rod and bushing. At its right-hand end the bushing 143 bears against the thrust bearing 139 and at its left-hand end the bushing bears against a shoulder 138b of the rod 138. Arc-slotted lever 40 and bushing 143 are rotatable both with respect to the rod 138 and with respect to the mounting 137. Arc-slotted lever 46 and time scale 50 are rotatably mounted on a third bushing 145 which is fixed to mounting 137. A spring washer 146 urges lever 46 and arm 50a of time scale 50 against a shoulder 145a of bushing 145 in such manner that the lever and time scale are rotatable with respect to mounting 137. Thus, with the construction shown, arc-slotted levers 40 and 46, operating lever 36, and time-of-hold indicating arm 73 are independently rotatable in such manner that there is no undesirable looseness of their respective bearings.

From the above description it is apparent that the present invention provides an apparatus readily adjustable to control the variation of a process condition, such as temperature, in accordance with a relatively broad selection of predetermined time schedules. Changes may be made from schedule to schedule with comparative ease by making a few simple adjustments. It is, of course, to be understood that the above description refers to a specific embodiment of the invention and the scope of the invention is to be determined from the claims appended hereto.

I claim:
1. In control apparatus for maintaining the position of a movable element in correspondence with a predetermined but adjustable time schedule, the combination of a movable member, means for moving said member at constant speed, means interconnecting said member and said element for causing said element to move from a zero position with movement of said member, said interconnecting means being adjustable to vary the rate at which said element moves with respect to the rate of movement of said member, and stop means for stopping the movement of said element at the end of a predetermined interval of time after said element starts moving from said zero position, said stop means being adjustable independently of said interconnecting means and said member to adjust the length of said interval of time.

2. In control apparatus for maintaining the position of a movable element in correspondence with a predetermined but adjustable time schedule, the combination of a movable member, means for moving said member at constant speed, means interconnecting said member and said element for causing said element to move with movement of said member, said interconnecting means being adjustable to vary the rate at which said element moves with respect to the rate of movement of said member, first stop means for stopping the movement of said element a predetermined interval of time after the initial movement of said member, and second stop means for stopping the movement of said member a predetermined interval of time after the stopping of said element, said first stop means and second stop means being adjustable independently of said interconnecting means and independently of one another to adjust the lengths of said intervals of time.

3. In control apparatus for maintaining the position of a movable element in correspondence with a predetermined but adjustable time schedule, the combination of a movable member, means for moving said member at constant speed, means interconnecting said member and said element for causing said element to move with movement of said member, said interconnecting means being adjustable to vary the rate at which said element moves with respect to the rate of movement of said member, indicating means adjustable conjointly with adjustment of said interconnecting means to indicate the final position to be attained by said element, and stop means for stopping the movement of said element a predetermined interval of time after the initial movement of said element, said stop means being adjustable independently of said interconnecting means and said member to adjust the length of said time interval.

4. In control apparatus for maintaining the position of a movable element in correspondence with a predetermined but adjustable time schedule, the combination of a movable member, means for moving said member at a constant speed from an initial neutral position, means for determining the initial neutral position of said member, means interconnecting said member and said element for causing said element to move with movement of said member, said interconnecting means being adjustable to vary the rate at which said element moves with movement of said member and stop means for stopping the movement of said element a predetermined interval of time after the initial movement of said member, said stop means being adjustable independently of said interconnecting means and said member to adjust the length of said time interval.

5. In control apparatus for maintaining the position of a movable element in correspondence with a predetermined but adjustable time schedule, the combination of a movable member, means for moving said member at constant speed, means interconnecting said member and said element for causing said element to move with movement of said member, said interconnecting means being adjustable to vary the rate at which said element moves with respect to the rate of movement of said member, stop means for stopping the movement of said element a predetermined interval of time after the initial movement of said member, said stop means being adjustable independently of said interconnecting means and said member to adjust the length of said time interval, and indicating means adjustable conjointly with adjustment of said stop means for indicating the magnitude of said time interval.

6. In control apparatus for maintaining the position of a movable element in correspondence with a predetermined but adjustable time schedule, the combination of a movable member, means for moving said member at constant speed, means interconnecting said member and said element for causing said element to move with movement of said member, said interconnecting means being adjustable to vary the rate at which said element moves with respect to the rate of movement of said member, first stop means for stopping the movement of said element a predetermined interval of time after the initial movement of said member, said first stop means being adjustable independently of said interconnecting means and said member to adjust the length of said time interval, indicating means adjustable conjointly with adjustment of said first stop means for indicating the length of said time interval, second stop means for stopping the movement of said member a predetermined interval of time after the stopping of said element, said second stop means being adjustable independently of said interconnecting means and said first stop means, and indicating means adjustable conjointly with adjustment of said second stop means for indicating the magnitude of said second time interval.

7. Control apparatus for maintaining the position of a movable element in correspondence with a predetermined but adjustable time schedule, the combination of a member adapted to be rotated at constant speed, motor means for driving said member, means mechanically interconnecting said member and said element for causing said element to move with movement of said member, said interconnecting means being adjustable to vary the rate at which said element moves with respect to the rate of movement of said member, means for energizing said motor means to cause said member to rotate, and means for deenergizing said motor means a predetermined interval of time after said motor means is energized to cause said member to stop rotating.

8. In a controller for controlling the value of a condition by regulating a controlled variable affecting the value of said condition in response to the value of said condition and in response to time, the combination of control means for regulating said controlled variable, condition-responsive means responsive to the value of said condition for operating said control means, and time-responsive mechanism for operating said control means conjointly with said condition-responsive means, said time-responsive mechanism comprising a movable element for operating said control means, a movable member, means for moving said member at constant speed, means interconnecting said member and said element for causing said element to move with movement of said member, said interconnecting means being adjustable to vary the rate at which said element moves with movement of said member, and stop means for stopping the movement of said element a predetermined interval of time after the initial movement of said member said stop means being adjustable independently of said interconnecting means and said member to adjust the length of said period of time.

9. In a controller for controlling the value of a condition by regulating a controlled variable affecting the value of said condition in response to the value of said condition and in response to time, the combination of control means for regulating said controlled variable, condition-responsive means responsive to the value of said condition for operating said control means, and time-responsive mechanism for operating said control means conjointly with said condition-responsive means, said time-responsive mechanism comprising a movable element for operating said control means, a movable member, means for moving said member at constant speed, means interconnecting said member and said element for causing said element to move with movement of said member, said interconnecting means being adjustable to vary the rate at which said element moves with movement of said member, indicating means adjustable conjointly with adjustment of said interconnecting means for indicating the maximum value to be attained by said condition, and stop means for stopping the movement of said element a predetermined interval of time after the initial movement of said member, said stop means being adjustable independently of said interconnecting means and said member to adjust the length of said time interval.

10. In a controller for controlling the value of a condition by regulating a controlled variable affecting the value of said condition in response to the value of said condition and in response to time, the combination of control means for regulating said controlled variable, condition-responsive means responsive to the value of said condition for operating said control means, and time-responsive mechanism for operating said control means conjointly with said condition-responsive means, said time-responsive mechanism comprising a movable element for operating said control means, a rotatable member, means for rotating said member at constant speed from an initial neutral position, means for initiating movement of said member at a predetermined value of said condition, means mechanically interconnecting said member and said element for causing said element to move with movement of said member, said interconnecting means being adjustable to vary the rate at which said element moves with movement of said member, and stop means for stopping the movement of said element a predetermined interval of time after the initial movement of said member, said stop means being adjustable independently of said interconnecting means and said member to adjust the length of said time interval.

11. In a controller for controlling the value of a condition by regulating a controlled variable affecting the value of said condition in response to the value of said condition and in response to time, the combination of control means for regulating said controlled variable, condition-responsive means responsive to the value of said condition for operating said control means, and time-responsive mechanism for operating said control means conjointly with said condition-responsive means, said time-responsive mechanism comprising a movable element for operating said control means, a member adapted to be rotated at a constant speed from an initial neutral position, motor means for driving said member, means for energizing said motor means at a predetermined value of said condition, means mechanically interconnecting said member and said element for causing said element to move with movement of said member, said interconnecting means being adjustable to vary the rate at which said element moves with movement of said member, stop means for stopping the movement of said element a predetermined interval of time after the initial movement of said member, and means for deenergizing said motor means a predetermined interval of time after said motor means is energized.

12. In a controller for controlling the value of a condition by regulating a controlled variable affecting the value of said condition in response to the value of said condition and in response to time, the combination of control means for regulating said controlled variable, condition-responsive means responsive to the value of said condition for operating said control means, and time-responsive mechanism for operating said control means conjointly with said condition-responsive means, said time-responsive mechanism comprising a movable element for operating said control means, a member adapted to be rotated at a constant speed from an initial neutral position, motor means for driving said member, control mechanism operated by said condition-responsive means for energizing said motor means at a predetermined value of said condition, means mechanically interconnecting said member and said element for causing said element to move with movement of said member, said interconnecting means being adjustable to vary the rate at which said element moves with movement of said member, stop means for stopping the movement of said element a predetermined interval of time after the initial movement of said member, and time-responsive means for deenergizing said motor means a predetermined interval of time after said motor means is energized.

13. In control apparatus for maintaining the position of a movable element in correspondence with a predetermined but adjustable time schedule, the combination of a slotted lever means for rotating said lever at a constant speed, a link operatively conected to said movable element and slidably connected in the slot of said lever for causing said element to move with movement of said lever, and means for adjusting said link in said slot to vary the rate at which said element moves with said lever, said adjusting means including an adjustment stud and spring means to prevent injury of said link due to overadjustment.

14. In control apparatus for maintaining the position of a movable element in correspondence with a predetermined but adjustable time schedule, the combination of a first slotted lever means for rotating said lever about an axis at a constant speed, a link operatively connected to said movable element and slidably connected to the slot of said slotted lever for causing said element to move with movement of said lever, means for adjusting said link in said slot to vary the rate at which said element moves with said lever, and means adjustable conjointly with said last-mentioned adjusting means for indicating the final position of said element, said conjointly adjustable means including a second slotted lever coaxial with said first slotted lever, an indicator, and a link operatively connected to said indicator and slidably connected in the slot of said second slotted lever.

15. In apparatus for controlling the value of a condition of a process in accordance with a predetermined schedule, in combination, a pneumatic couple comprising a flapper and nozzle, means responsive to the value of said condition for relatively moving said flapper and nozzle, time-responsive means for relatively moving said nozzle and flapper including a constant speed electric motor, a shaft rotated by said motor, and linkage mechanism operatively connecting said shaft and said pneumatic couple, control mechanism operated by said condition-responsive means and including a second pneumatic couple for energizing said motor when the value of said condition reaches a predetermined magnitude, and means for deenergizing said motor a predetermined interval of time after said motor is energized.

LYMAN COOK.